United States Patent [19]

Lask et al.

[11] 4,403,106
[45] Sep. 6, 1983

[54] TERMINAL ENCLOSURE FOR CABLE STUBS, WITH VARIABLE ENTRY POSITIONS

[75] Inventors: Zygmunt Lask, Montreal; Harold Johnston, Lachine, both of Canada

[73] Assignee: Northern Telecom Limited, Montreal, Canada

[21] Appl. No.: 303,831

[22] Filed: Sep. 21, 1981

[51] Int. Cl.³ .............................................. H02G 3/08
[52] U.S. Cl. ................................... 174/59; 174/65 R; 361/428
[58] Field of Search .............. 174/59, 60, 65 R, 65 G, 174/64; 361/426, 428; 339/122 R, 150 T, 198 C, 198 E

[56] References Cited

U.S. PATENT DOCUMENTS

| | | | |
|---|---|---|---|
| 1,301,175 | 4/1919 | Sachs | 361/372 X |
| 1,316,218 | 9/1919 | Bloomer | 361/370 |
| 2,324,791 | 7/1943 | McLoughlin et al. | 174/60 |
| 2,924,639 | 2/1960 | Zelt | 174/59 |
| 3,617,811 | 11/1971 | McVoy | 174/59 X |

*Primary Examiner*—A. T. Grimley
*Assistant Examiner*—D. A. Tone
*Attorney, Agent, or Firm*—Sidney T. Jelly

[57] ABSTRACT

A stubbed cable terminal enclosure has a housing and a cover in which alternative entry and exit positions are provided. In one embodiment it is possible to vary entry and/or exit positions, at the housing ends, before or after installation. The same housing and an alternative cover enables entry and exit through the cover. Interchangeable blanking members and cable sleeve members permit such variations and ensure that all apertures are closed.

16 Claims, 13 Drawing Figures

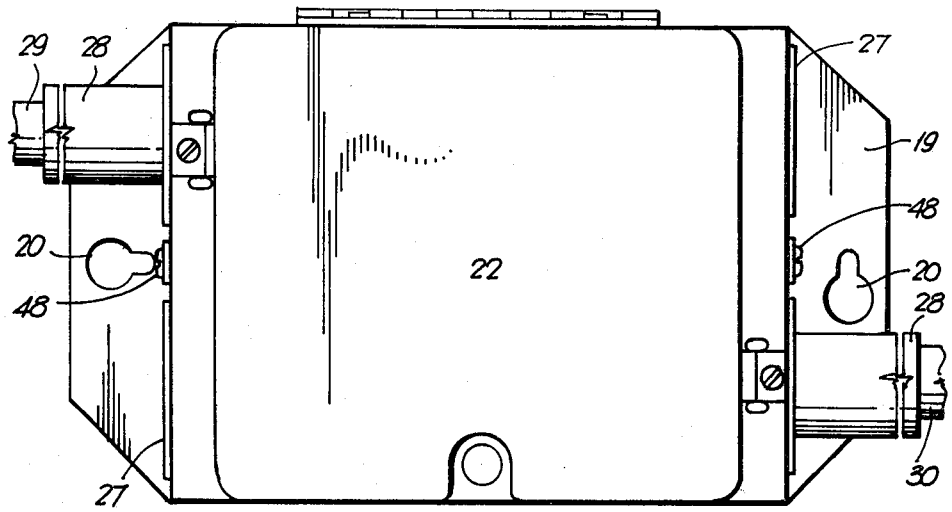
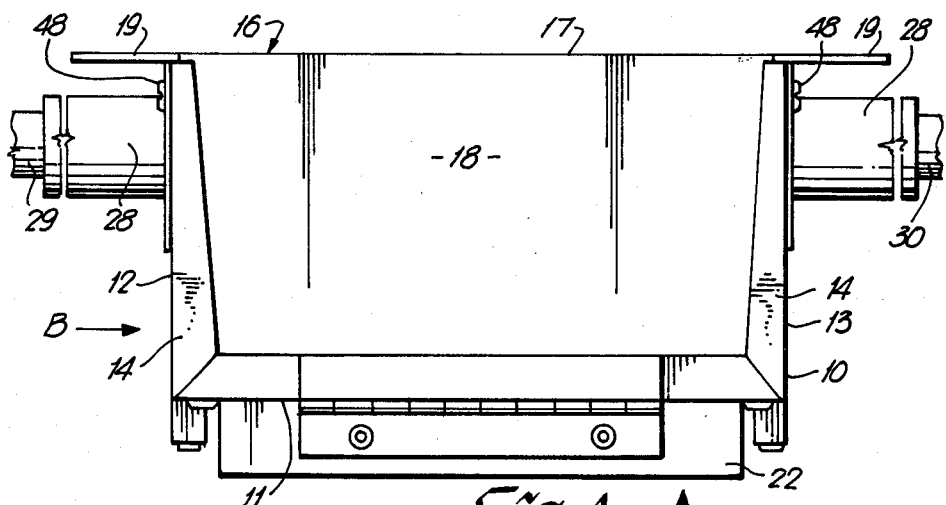
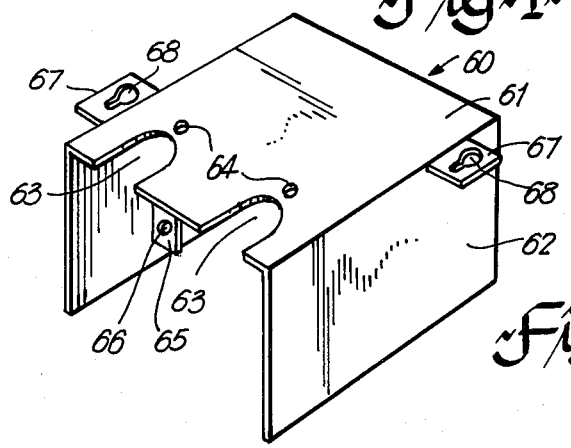

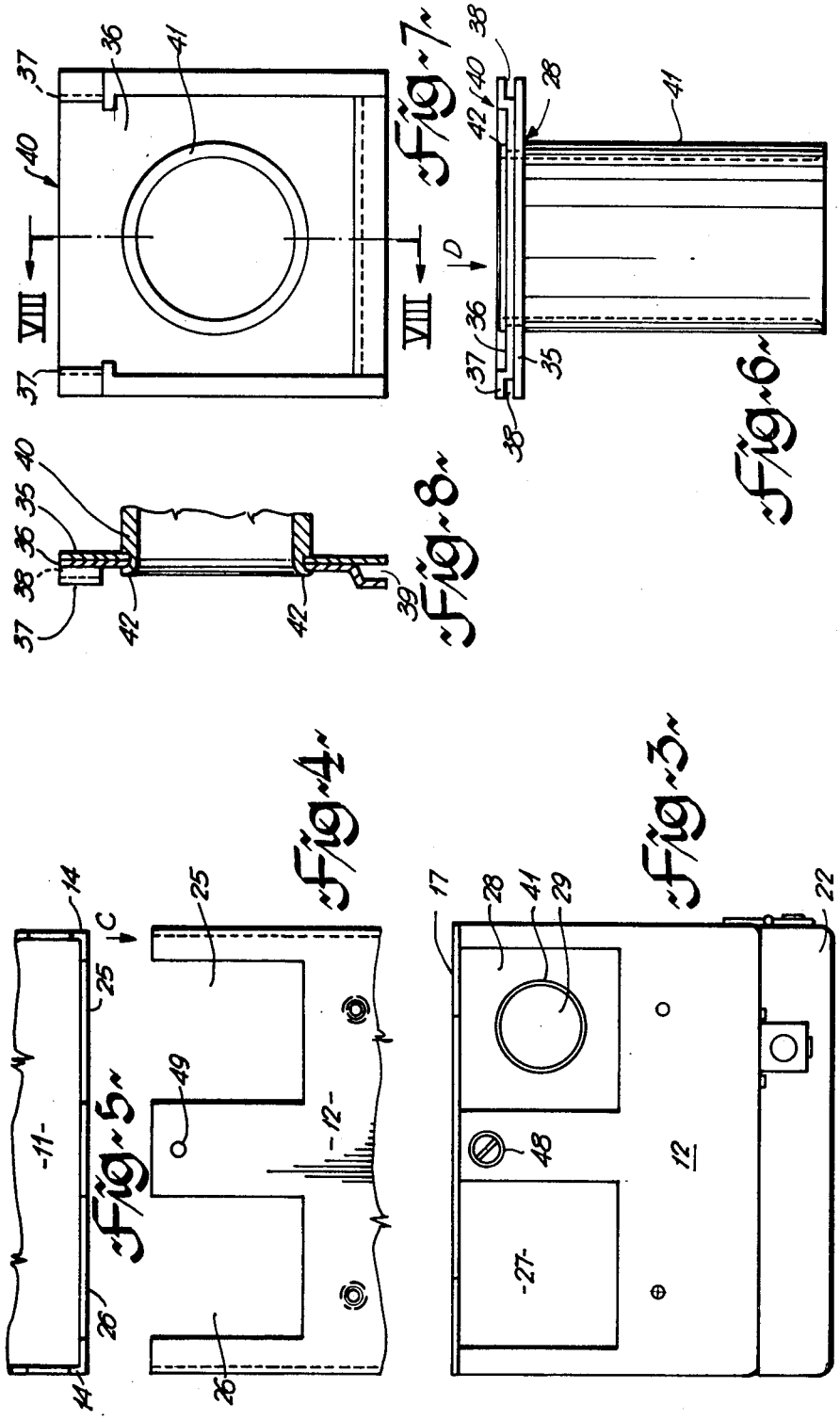

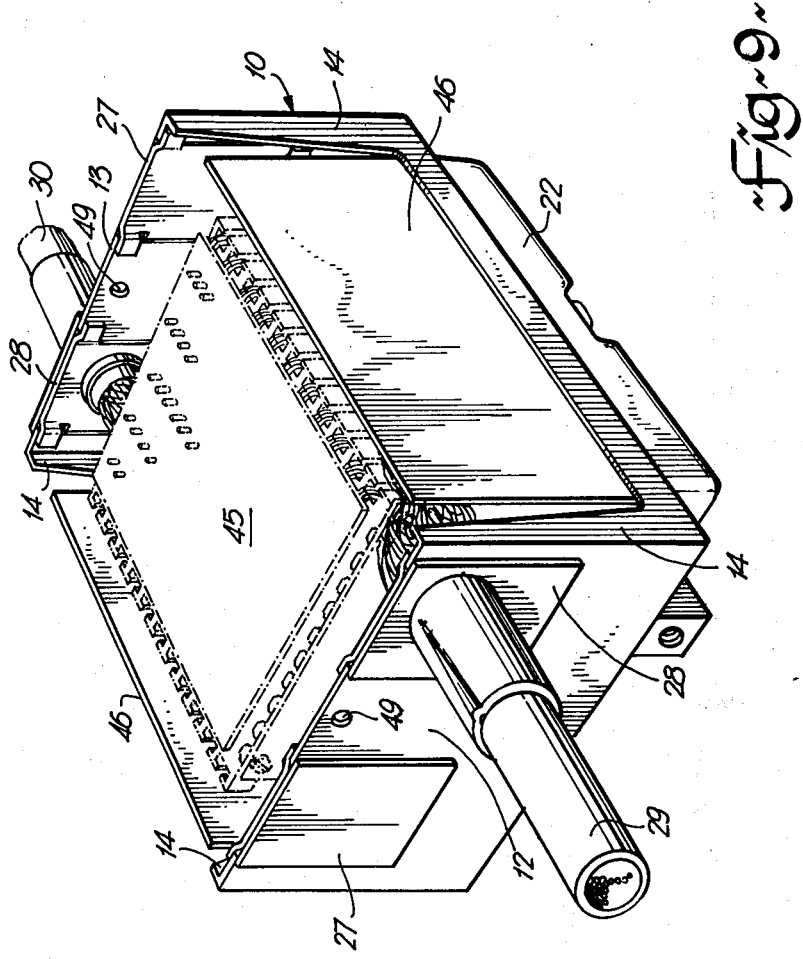

TERMINAL ENCLOSURE FOR CABLE STUBS, WITH VARIABLE ENTRY POSITIONS

This invention relates to a terminal enclosure for stubbed cables, with one cable end entering the enclosure and the other cable end exiting the enclosure, with alternate entry and exit positions on the enclosure.

Cables, or more specifically the conductors of cables, for telecommunications systems, are connected in a transfer enclosure, one cable normally entering at one side and the other cable exiting at the other side. Depending upon circumstances, so the actual entry and exit positions may vary and a variety of forms of enclosures are stocked to provide for the various alternatives. Once installed and the cables connected, any need to change the cable entry and exit positions is practically impossible to meet.

The present invention provides an enclosure, with housing and cover, in which alternative entry and exit positions are provided. In one embodiment the entry and exit positions can be varied before or after installation. Variation after installation is possible without the necessity of breaking and remaking connections. In an alternative embodiment, with the same housing and an alternative cover, entry and exit through the cover can be provided. Interchangeable blanking members and cable sleeve members ensure that at all times all the entry and exit positions are closed, either by the cable sleeve member and cable or by a blanking member.

The invention will be readily understood by the following description of embodiments, by way of example, in conjunction with the accompanying drawings, in which:

FIG. 1 is a side view of an enclosure, with a cable at each end.

FIG. 2 is a plan view in the direction of arrow A in FIG. 1;

FIG. 3 is an end view in the direction of arrow B in FIG. 1;

FIG. 4 is a partial end view of the housing of the enclosure illustrating the exit and entry positions;

FIG. 5 is a view in the direction of arrow C in FIG. 4, of the end of the housing;

FIG. 6 is a plan view of a cable sleeve for use with the enclosure;

FIG. 7 is a view in the direction of arrow D in FIG. 6;

FIG. 8 is a cross-section on the line VIII—VIII of FIG. 7;

FIGS. 9, 10 and 11 are perspective views of the housing of an enclosure, with cover removed, illustrating the steps from a cable entering at each end, as in FIG. 1, to both cables entering from the same end;

FIG. 13 is a perspective view of a modified cover for use with the housing as in FIG. 12.

Figure 10:
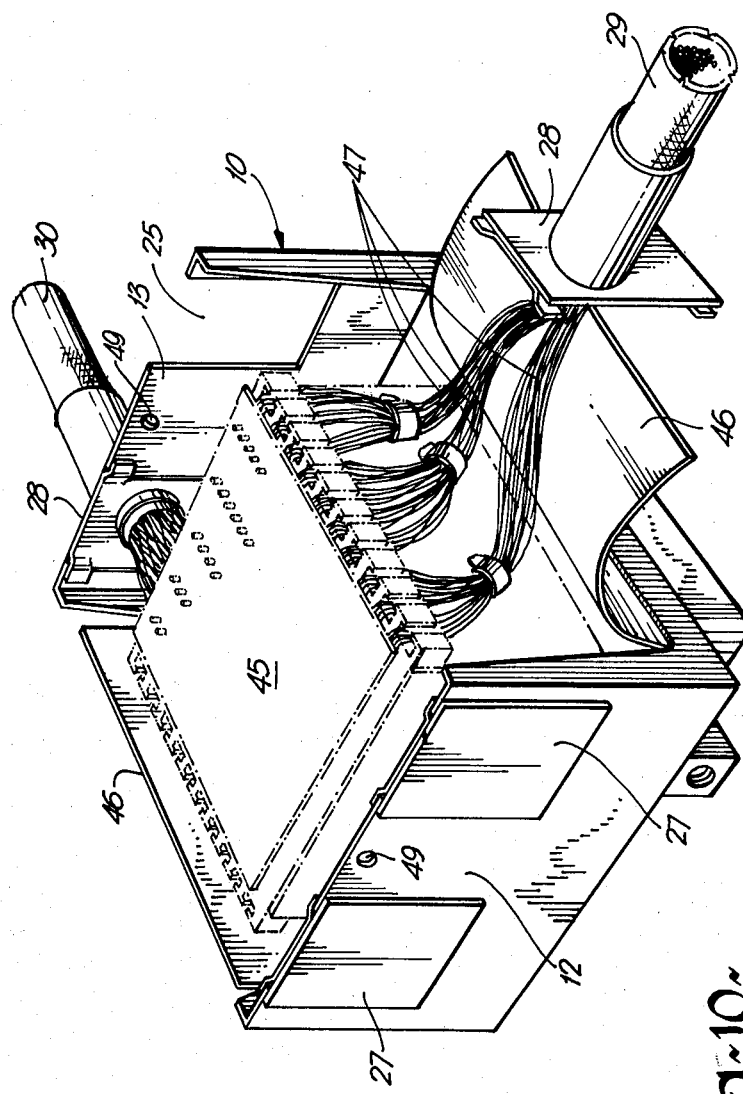

As illustrated in FIGS. 1, 2 and 3, the enclosure has a housing 10 having base 11 and upturned ends 12 and 13, to form a trough shaped member. The side edges 14 of the ends are bent in as are also the edges of the base 11. A cover 16 having a top web 17 and sides 18, slides down into the housing to form the enclosure. Extensions 19 on the top web provide mounting means, for example by keyhole apertures 20.

A hinged lid 22 is attached to the base of the housing for providing access, through a large aperture, not shown, in the base.

In each end 12 and 13 are two rectangular apertures 25 and 26. These are seen in FIGS. 4 and 5. Fitting in the apertures are alternatively blanking members 27 or cable sleeve members 28, as seen in FIGS. 1, 2 and 3. In FIGS. 1, 2 and 3, cables 29 and 30 are shown in the sleeves. Generally the enclosures will be provided with two sleeve members and two blanking members.

FIGS. 6, 7 and 8 illustrate a cable sleeve member 28, although a blanking member 27 is very similar in many respects. A sleeve comprises a blanking portion 34 having two sheets of metal 35 and 36 joined together, as by spot welding. The outer sheet 35 is somewhat larger in width and height than the apertures 25 and 26. The inner sheet 36 is narrower for most of the height but has two projections 37 bent out and then back parallel to the inner sheet 35 to define two slots 38, a slot at the upper end of each side of the blanking portion 34, as seen in FIG. 6. Also the bottom edge of the inner sheet is bent out and then back parallel to the inner sheet to define a transverse slot 39, along the bottom of the blanking portion 34, as seen in FIG. 8. The slot 39 engages over the bottom of an aperture 25 or 26, and the slots 38 engage over the sides of an apertures 25 or 26 adjacent to the top. Once the cover 16 is on the housing the sleeves are held in place. An aperture 40 is formed through the blanking portion 34. Extending from the sheets of metal 35 and 36 is a tubular member 41. As seen in FIG. 8, the end of the tubular member is reduced in diameter on the outside and passes through the aperture 40 in the sheets, being dressed over at 42 on to the inner sheet to form an assembly. The cable end is passed through the tubular member and the tubular member crimped on to the outside of the cable.

The blanking members comprise just a blanking portion, comprising two sheets of metal attached together. The inner and outer sheets are as in the sleeve member with the exception that there is no tubular member and therefore no aperture through the sheets.

Figure 11:
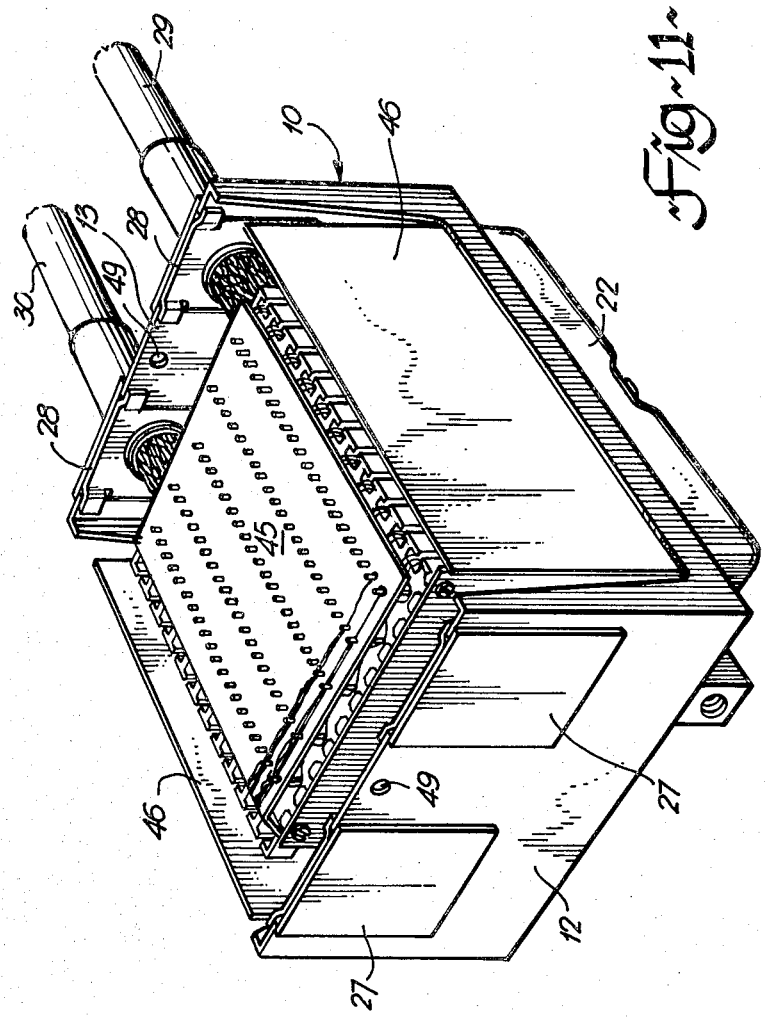

FIGS. 9, 10 and 11 illustrate how the enclosure is changed, from a cable entry at each end to two cables entering at the same end. Within the enclosure 10 is a terminal block 45, the terminal block having a plurality of terminal pins on the upper surface, the conductors from the cables 29 and 30 being connected to the pins. The pins connect to terminals in the block 45. Typically housed within the terminal block 45 are surge and overvoltage protectors which plug into the terminals, access being via the lid 22. At each side of the enclosure is a sheet of flexible plastic 46 which protects the conductors when the cover is applied, the sides 18 of the cover sliding down inside the side edges 14. However, this plastic sheet can be omitted.

In FIG. 9, the cable 29, in sleeve member 28, is inserted in aperture 25 at one end 12 and a blanking member 27 is in aperture 26 at the same end. Cable 30, in sleeve member 28 is in aperture 26 at the other end, 13, and a blanking member 27 is in aperture 26 at this end.

To change ends, for cable 29 as an example, the sleeve member 28 is slid up and out of the aperture 25 and cable and sleeve member moved round, straightening the conductors, shown at 47. The plastic sheet 46 is bent down. The blanking member 27 is removed from aperture 25 at the same end 13 as cable 30 and reinserted in aperture 25 from which cable 29 and sleeve member 28 have been removed. This is the condition as illustrated in FIG. 10.

Cable 29 and its sleeve member 28 is then moved round and the sleeve member inserted into the now open aperture 25. The plastic sheet 46 closes up and the condition is as illustrated in FIG. 11. Cable 30 can be moved from end 13 to end 12 in a similar manner, and if desired, both cables can be moved from entry positions at the same end for example end 13, to entry positions at the other end, end 12.

The cover is held in place by screws 48 passing through holes 49 in the ends 12 and 13, and entering threaded holes in brackets attached to the top web 17 of the cover.

The terminal enclosure may be required to be mounted in various ways and the alternative entries and exits as provided in the arrangement illustrated in FIGS. 1 to 11 provides for a variety of requirements wherein the cables need to enter and exit in a direction parallel to the top web 17 of the cover. Generally, in use, the cover 16 is the mounting base with the lid 22 readily accessible.

However, it is also sometimes required that the terminal enclosure be mounted on a frame or similar support, with the cables arriving perpendicular to the top web of the cover.

Figure 12:
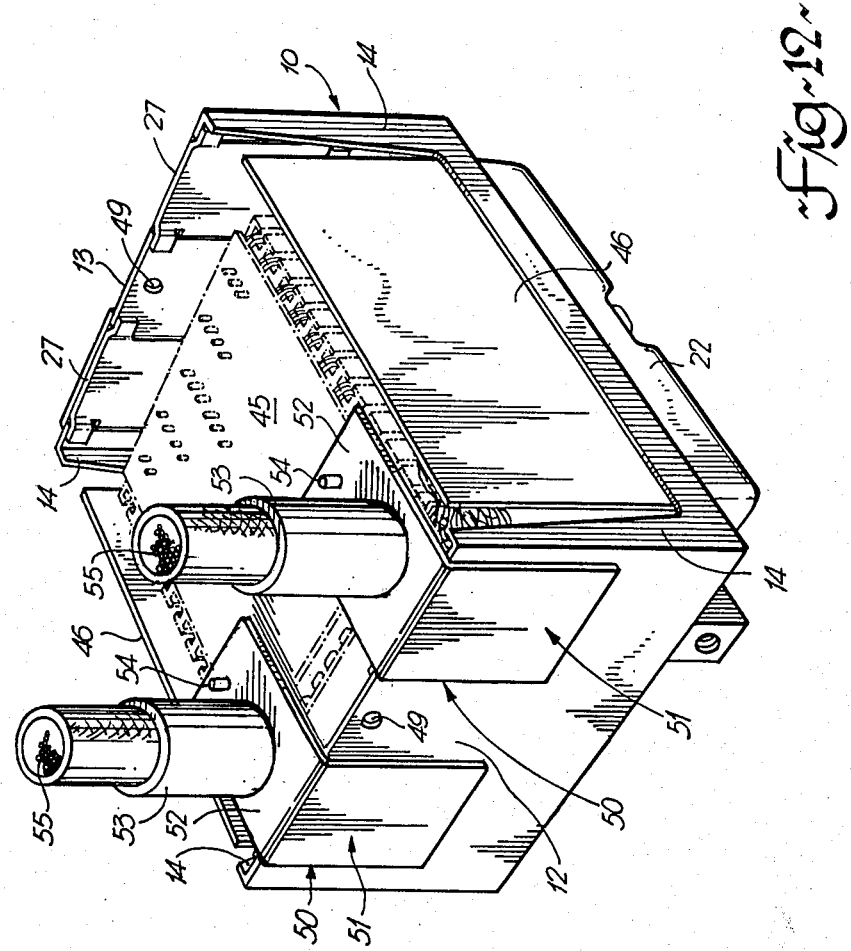
FIG. 12 is a perspective view of a housing as in FIGS. 1–5 and 9, 10 and 11, with an alternative form of cable sleeve.

FIG. 12 illustrates a housing, as in FIGS. 1 to 5 and 9, 10 and 11, in which a modified form of cable sleeve is provided. As illustrated in FIG. 12, the housing 10 has a base and upturned ends 12 and 13. The side edges 14 of the ends are bent in, and also the edges of the base 11. This is the same form of housing and in each end are two rectangular apertures. At one end, end 13, as illustrated, the rectangular apertures are closed by blanking members 27. At the other end, end 12, two cable sleeve members 50 fit in the rectangular apertures.

The cable sleeve members have blanking portions 51 which are of the same form as the blanking portions forming the blanking members 27, that is having two sheets of metal attached together with projections and slots to enable them to fit into and be retained in the apertures. However, the outer sheet of metal is extended, at 52, and bent over to be perpendicular to portion 51, that is to extend inwards over the terminal block 45. In the portion 52 a hole is formed and a tubular member 53 is fitted therein. This part or portion 52 is similar to the cable sleeve member 28 of the previous embodiment, except that portion 52 is of only one sheet of metal. A threaded stud 54 extends up from the portion 52, inward of the tubular member 53. A cable end 55 is shown in each tubular member or sleeve 53. The cable is secured in the sleeve by crimping for example.

For the arrangement of FIG. 12, a modified cover is used. This is illustrated in FIG. 13. Cover 60 is very similar to that of cover 16 in FIGS. 1, 2 and 3. It has a top web 61 and sides 62. The sides 16 slide down inside the edges 14 and inside the bent in edges of the base. In this embodiment, two U-shaped slots or openings 63 are formed at one end of the top web 61 and small holes 64. The slots 63 fit over the extensions 52 of the cable sleeve members and around the tubular members 53. The studs 54 on the cable sleeve members pass up through the holes 64 and nuts are screwed on to the stud. Small brackets 65 with threaded holes 66, receive the screws 48 (FIG. 1) which pass through holes 49 in the housing. The studs 54 on the cable sleeve members 50 provide support for the extension 52 against flexing. Instead of extensions 19, as in FIGS. 1 and 2, small brackets 67 are provided at the sides of the cover, with key-hole openings 68. Brackets at the ends can be provided as desired.

The cable sleeve members can be positioned in either end of the housing and the cover 60 orientated to suit. Alternatively, the cover can be provided with sections partially blanked but still in place, as knock-outs, at both ends, to enable the U-shaped slots to be provided at either end.

The enclosures of the invention provide a terminal enclosure which can be used initially for any desired arrangement of cable entries, with one enclosure and two forms of cover. The entry arrangement can be varied at will without having to change the enclosure. This is particularly an advantage in the enclosure of FIGS. 1, 2 and 3 if it is desired to change the cable entry and/or exit positions once mounted, in that connections to the terminal pins do not have to be altered or remade. Normally changing the cable entry and exit positions in the example of FIGS. 12 and 13, once installed, is not done, but this possible.

What is claimed is:

1. A terminal enclosure for stubbed cables comprising a housing and a cover, said enclosure having a base and upturned ends extending perpendicular to the base;

said cover having a top web and sides extending down from said web and perpendicular thereto;

two rectangular apertures in each end of said housing, said apertures extending down from top edges of said ends towards said base;

blanking members in two of said apertures and cable sleeve members in the other two apertures;

said sides of said cover fitting between said ends of said housing and means retaining said cover in position on said housing, the cover retaining said blanking members and said cable sleeve members in position in said apertures.

2. An enclosure as claimed in claim 1, said cable sleeve members including a tubular member extending perpendicular to said ends.

3. An enclosure as claimed in claim 1, each of said cable sleeve members including an extension extending inward, perpendicular to said ends of said housing, and a tubular member extending up from and perpendicular to said extension, said cover having slots at least at one end to extend round said tubular members.

4. An enclosure as claimed in claim 3, including a threaded stud extending upward at an inner end of each of said extensions; holes in said top web of said cover, said studs extending through said holes; and nuts threaded on said studs to connect said extensions to said top web.

5. An enclosure as claimed in claim 1, including a terminal block in said housing and terminal pins on an upper surface of said terminal block, the arrangement such that conductors from stub cables in said cable sleeve members are connected to said terminal pins.

6. An enclosure as claimed in claim 5 including a hinged lid on said base of said housing for access to the lower end of said terminal block.

7. An enclosure as claimed in claim 5, including a stub cable in each cable sleeve member, conductors of said cables connected to said terminal pins of said terminal block.

8. An enclosure as claimed in claim 7, a cable at each end of said housing.

9. An enclosure as claimed in claim 7, two cables at the same end of said housing.

10. An enclosure as claimed in claim 7, said cables entering through and perpendicular to, said top web of said cover.

11. An enclosure as claimed in claim 1, including extensions on said top web of said cover, said extensions in a plane parallel to the plane of said top web, and an aperture in each extension, for mounting of the enclosure on a support.

12. An enclosure as claimed in claim 1, each of said blanking members including a slot extending along a bottom edge and a slot at an upper end of each side of said blanking member, for engagement with side and bottom edges of said rectangular apertures in each end of said base.

13. An enclosure as claimed in claim 1, each of said cable sleeve members including a blanking portion having a slot extending along a bottom edge and a slot at an upper end of each side of said blanking portion, for engagement with side and bottom edges of said rectangular apertures in each end of said base.

14. An enclosure as claimed in claim 13, including an aperture in the blanking portion of each cable sleeve member, and a tubular member extending from said aperture, in an outward direction.

15. An enclosure as claimed in claim 13, said blanking portion having an extension, extending perpendicular to said blanking portion, inwards of said housing; an aperture in said extension; and a tubular member extending from said aperture, in an outward direction.

16. An enclosure as claimed in claim 1, including a flexible plastic sheet extending up from said base of said housing, on each side of said housing.

* * * * *